United States Patent
Lewis et al.

(10) Patent No.: US 11,556,817 B2
(45) Date of Patent: Jan. 17, 2023

(54) USING A MACHINE LEARNING MODULE TO RANK TECHNICAL SOLUTIONS TO USER DESCRIBED TECHNICAL PROBLEMS TO PROVIDE TO A USER

(71) Applicant: INTERNATIONAL BUSINESS MACHINES CORPORATION, Armonk, NY (US)

(72) Inventors: Cecilia Carranza Lewis, San Jose, CA (US); Peter Hung Quach, Tucson, AZ (US); Samantha Jean Wareing, Tucson, AZ (US); Nicholas Ikaika Bostwick, Tucson, AZ (US); David C. Reed, Tucson, AZ (US); Chen Zhao, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 371 days.

(21) Appl. No.: 16/868,518

(22) Filed: May 6, 2020

(65) Prior Publication Data
US 2021/0350251 A1    Nov. 11, 2021

(51) Int. Cl.
*G06N 5/04* (2006.01)
*G06F 16/2457* (2019.01)
*G06N 20/00* (2019.01)

(52) U.S. Cl.
CPC ......... *G06N 5/04* (2013.01); *G06F 16/24578* (2019.01); *G06N 20/00* (2019.01)

(58) Field of Classification Search
CPC ..... G06N 5/04; G06N 20/00; G06F 16/24578
See application file for complete search history.

(56) References Cited

U.S. PATENT DOCUMENTS

| | | | |
|---|---|---|---|
| 6,678,882 B1 | 1/2004 | Hurley et al. | |
| 7,487,513 B1 | 2/2009 | Savchenko et al. | |
| 8,230,397 B2 | 7/2012 | Farrell et al. | |
| 8,621,278 B2 | 12/2013 | Petukhov et al. | |
| 2007/0073651 A1* | 3/2007 | Imielinski | G06F 16/24 |

(Continued)

OTHER PUBLICATIONS

Gupta, R. et al., "Multi-dimensional Knowledge Integration for Efficient Incident Management in a Services Cloud", Proceedings of the 2009 International Conference on Services Computing, Sep. 2009, 8 pp.

(Continued)

*Primary Examiner* — Jay A Morrison
(74) *Attorney, Agent, or Firm* — Konrad Raynes Davda & Victor LLP; David W. Victor

(57) ABSTRACT

Provided are a computer program product, system, and method for using a machine learning module to rank technical solutions to user described technical problems to provide to a user. A solutions database is searched to determine a result set of answer files having keywords related to keywords of a technical problem in a user description. The result set of answer files, the user description of the technical problem, user profile information, and technical specifications of the computing system are provided as input to a machine learning module. The machine learning module outputs ranks of the answer files in the result set. A subset of answer files in the result set is selected based on ranks of the answer files in the result set and returned to the user.

20 Claims, 6 Drawing Sheets

(56) References Cited

U.S. PATENT DOCUMENTS

| | | | |
|---|---|---|---|
| 2008/0172574 A1 | 7/2008 | Fisher | |
| 2009/0183021 A1 | 7/2009 | Arnold et al. | |
| 2009/0276728 A1 | 11/2009 | Doan et al. | |
| 2013/0036367 A1 | 2/2013 | DeRoos et al. | |
| 2014/0278363 A1* | 9/2014 | Allen | G06F 16/9535 704/9 |
| 2015/0295939 A1* | 10/2015 | Rissanen | H04L 63/10 726/1 |
| 2016/0034457 A1* | 2/2016 | Bradley | G06F 16/24578 707/749 |
| 2017/0011308 A1* | 1/2017 | Sun | G06F 11/00 |
| 2017/0257329 A1* | 9/2017 | Tetreault | G06F 40/253 |
| 2021/0056150 A1* | 2/2021 | Karandish | G06F 16/3329 |
| 2021/0264438 A1* | 8/2021 | Singh | G06Q 10/20 |

OTHER PUBLICATIONS

Nie, K., et al., "Constraints: The Core of Supporting Automated Product Configuration of Cyber-Physical Systems", Proceedings of the 16th International Conference on Model-Driven Engineering Languages and Systems, vol. 8107, Sep. 2013, 18 pp.

* cited by examiner

User Profile Information

Historical Solution Record

USING A MACHINE LEARNING MODULE TO RANK TECHNICAL SOLUTIONS TO USER DESCRIBED TECHNICAL PROBLEMS TO PROVIDE TO A USER

BACKGROUND OF THE INVENTION

1. Field of the Invention

The present invention relates to a computer program product, system, and method for using a machine learning module to rank technical solutions to user described technical problems to provide to a user.

2. Description of the Related Art

Users may search knowledge databases for solutions to technical computer problems, such as frequently asked questions (FAQs) and community solution postings. An application user may enter information on the error they are experiencing to obtain search results providing solutions to the errors. Oftentimes, users may have to review numerous search results to try different solutions until one works. Further, depending on the user environment, some solutions may be limited while others may be more advantageous. For example, some features of a software program are only supported on certain releases. In addition, not all hardware supports all available functions.

There is a need in the art for improved techniques for determining solutions and fixes to user technical problems.

SUMMARY

Provided are a computer program product, system, and method for using a machine learning module to rank technical solutions to user described technical problems to provide to a user. A user description is received of a technical problem with respect to the computing system of the user. A user database is accessed to obtain user profile information and technical specifications of the computing system. A solutions database is searched to determine a result set of answer files having keywords related to keywords of the technical problem in the user description. The result set of answer files, the user description of the technical problem, the user profile information, and the technical specifications of the computing system are provided as input to a machine learning module. The machine learning module outputs ranks of the answer files in the result set. A subset of answer files in the result set is selected based on ranks of the answer files in the result set and returned to the user.

DETAILED DESCRIPTION

Described embodiments provide improvements to computer technology for providing solutions and fixes to technical computer problems. In prior art, the user may use a search engine to search a database of technical solutions to computer hardware, software, and network problems and then review the numerous results. With the described embodiments, a machine learning module considers as input user profile information including information on user computer configuration information and other criteria required by the user to rank search results of answer files having keywords related to the user description of the technical problem. Answer files may be selected based on the ranks of the answer files from the machine learning module. Further, ranked answer files may be excluded from consideration based on criteria required by the user. In this way, described embodiments optimize the fixes and solutions in answer files provided to the user to return those answer files ranked highest based on user profile information, user system technical configurations, and other criteria and requirements specific to the user requesting technical support.

Figure 1:
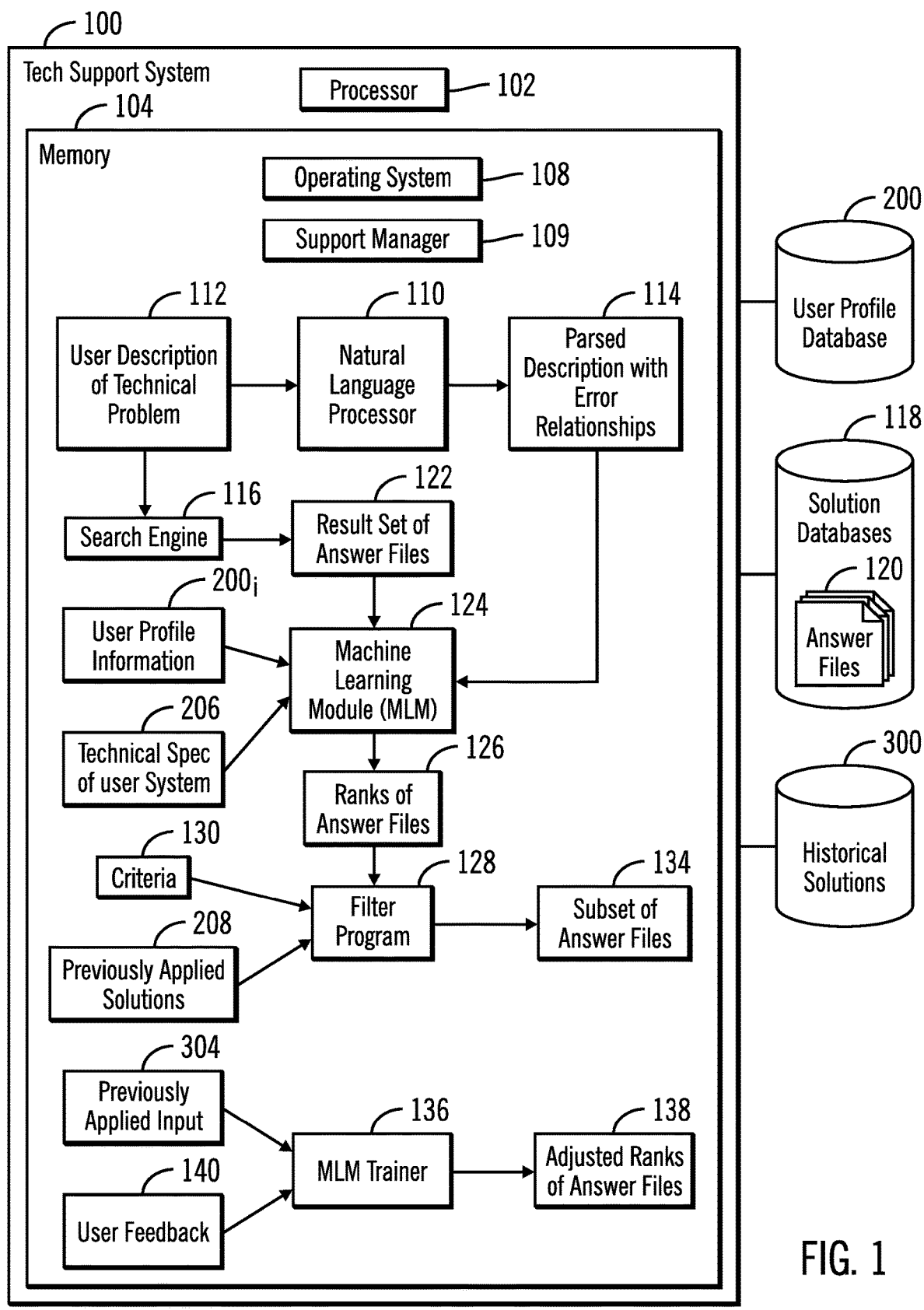
FIG. 1 illustrates an embodiment of a technical support system.

FIG. 1 illustrates a technical support system 100 in which embodiments are implemented. The technical support system 100 includes a processor 102 and a main memory 104. The main memory 104 includes various program components and data structures including: an operating system 108 to manage system 100 operations and flow of operations among the components; a support manager 109 to manage the overall flow of operations to process a user request for technical support; a natural language processor (NLP) 110, such as by way of example, the Watson™ Natural Language Understanding program, that parses a user description of a technical problem 112 to generate a parsed description 114 having keywords, described errors, and dependency relationships of the described errors; a search engine 116 to search a solution database 118 of answer files 120, providing descriptions of solutions and fixes to computer problems, to determine a result set of answer files 122 related to keywords of the user description 112; a machine learning module (MLM) 124 to receive as input user profile information 200, from a user profile database 300, the user description of the technical problem 112, and parsed description 114 on the user technical support request and generate ranks 126 of the result set of answer files 122, where the ranks 126 indicate a confidence or relevance score, such as between zero and one, indicating a strength or relevance of the answer files in the result set 122 to the user description 112; a filter program 128 to narrow the result set 122 based on criteria 130, such as usage information, historical records 208 (FIG. 2) of solutions/fixes the user previously applied, and regulatory requirements 210 (FIG. 2) to produce a subset of answer files 134 that satisfy the criteria 130; and a machine learning module (MLM) trainer 136 to receive historical solution information $300_i$, including previous input 304 to the machine learning module 124 and user feedback 140, to train the machine learning module 124 to produced adjusted ranks of answer files 138 based on user feedback to improve the predictability of the relevance of answer files for a particular user. (Watson is a trademark of International Business Machines Corporation throughout the world).

The memory 104 may comprise non-volatile and/or volatile memory types, such as a Flash Memory (NAND dies of flash memory cells), a non-volatile dual in-line memory module (NVDIMM), DIMM, Static Random Access Memory (SRAM), ferroelectric random-access memory (FeTRAM), Random Access Memory (RAM) drive, Dynamic RAM (DRAM), storage-class memory (SCM), Phase Change Memory (PCM), resistive random access memory (RRAM), spin transfer torque memory (STM-RAM), conductive bridging RAM (CBRAM), nanowire-based non-volatile memory, magnetoresistive random-access memory (MRAM), and other electrically erasable programmable read only memory (EEPROM) type devices, hard disk drives, removable memory/storage devices, etc.

Generally, program modules, such as the program components 108, 109, 110, 116, 124, 128, and 136, may comprise routines, programs, objects, components, logic, data structures, and so on that perform particular tasks or implement particular abstract data types. The program components and hardware devices of the technical support system 100 may be implemented in one or more computer systems, where if they are implemented in multiple computer systems, then the computer systems may communicate over a network.

The program components 108, 109, 110, 116, 124, 128, and 136 may be accessed by the processor 102 from the memory 104 to execute. Alternatively, some or all of the program components 108, 109, 110, 116, 124, 128, and 136 may be implemented in separate hardware devices, such as Application Specific Integrated Circuit (ASIC) hardware devices.

The functions described as performed by the program components 108, 109, 110, 116, 124, 128, and 136 may be implemented as program code in fewer program modules than shown or implemented as program code throughout a greater number of program modules than shown.

Certain of the components, such as the natural language processor 110 and machine learning module 124 may use machine learning and deep learning algorithms, such as artificial neural network programs. A neural network may be trained using backward propagation to adjust weights and biases at nodes in a hidden layer to produce a desired/correct categorization or outcome given the input. For instance, the machine learning module 124 may be trained to output rankings of answer files 126 based on various input, including characteristics of the user description of the technical problem 112, user profile information 200, (FIG. 2), criteria 130, technical specification of the user system 206, etc. The natural language processor 110 may be trained to process the user description of a technical problem 112 to categorize text as comprising errors, solutions, fixes, etc. and to characterize relationships among errors, such as dependency relationships for one error from another error to result in the observed error described in the user description of the technical problem 112.

In backward propagation used to train a neural network machine learning module, such as machine learning module 124, margin of errors are determined based on the output ranks 126 and user feedback 140 used to produce adjusted ranks of answer files 138. Biases at nodes in the hidden layer are adjusted accordingly to decrease the margins of error in outputted ranks 126 and the desired rank outcomes 138. Backward propagation may comprise an algorithm for supervised learning of artificial neural networks using gradient descent. Given an artificial neural network and an error function, the method may calculate the gradient of the error function with respect to the neural network's weights and biases.

The machine learning modules of the programs 110 and 124 may implement a machine learning technique such as decision tree learning, association rule learning, artificial neural network, inductive programming logic, support vector machines, Bayesian models, etc.

The arrows shown in FIG. 1 between the components and objects in the memory 104 represent a data flow between the components.

The term "user" may refer to a person or computer process, such as a bot.

Figure 2:
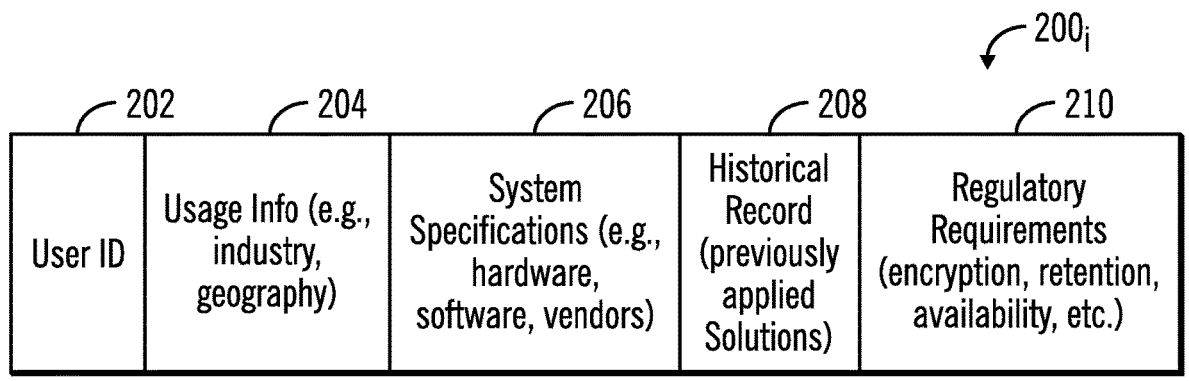
FIG. 2 illustrates an embodiment of user profile information.

FIG. 2 illustrates an embodiment of user profile information 200, in the user profile database 200 for a user submitting a request for technical support, including: a user identifier (ID) 202; usage information 204, such as an industry in which the user 202 is involved, entity, geographical location, etc.; system specifications 206 for the user computing system, including hardware and software configurations, version, vendors, activated features, capabilities, including inactivated features, etc.; historical records 208 of previously applied solutions and fixes; and regulatory (or enterprise) requirements 210, such as encryption level, retention requirements, availability/redundancy, geographical limitations, vendor compatibility, etc.

Figure 3:
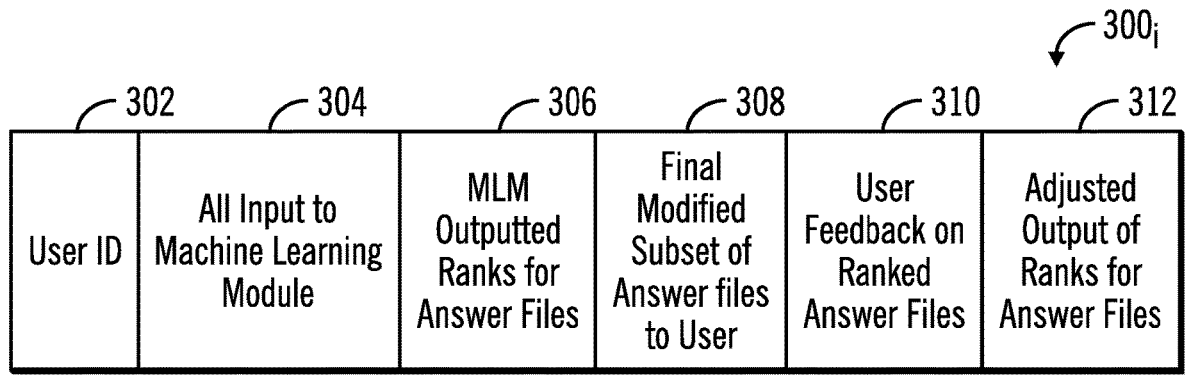
FIG. 3 illustrates an embodiment of a historical solution record having information generated when determining technical support fixes and solutions.

FIG. 3 illustrates an embodiment of a historical solution record $300_i$ in the historical solutions database 300 including information on past received answer files, including: a user identifier 302 for which the solution was provided; all the input 304 to the machine learning module 124 that produced the outputted ranks for answer files 306 for a technical support request; final modified subset of answer files provided to the user 308, such as files 134; user feedback 310 on the ranked answer files provided to the user; and adjusted output of the ranks for the answer files 312, adjusted based on the user feedback 308. The adjusted ranks 312 may be adjusted to a rank value specified by the user or adjusted upward or downward by a fixed or variable percentage based on whether the user indicated approval or disapproval of the rank.

Figure 4A:
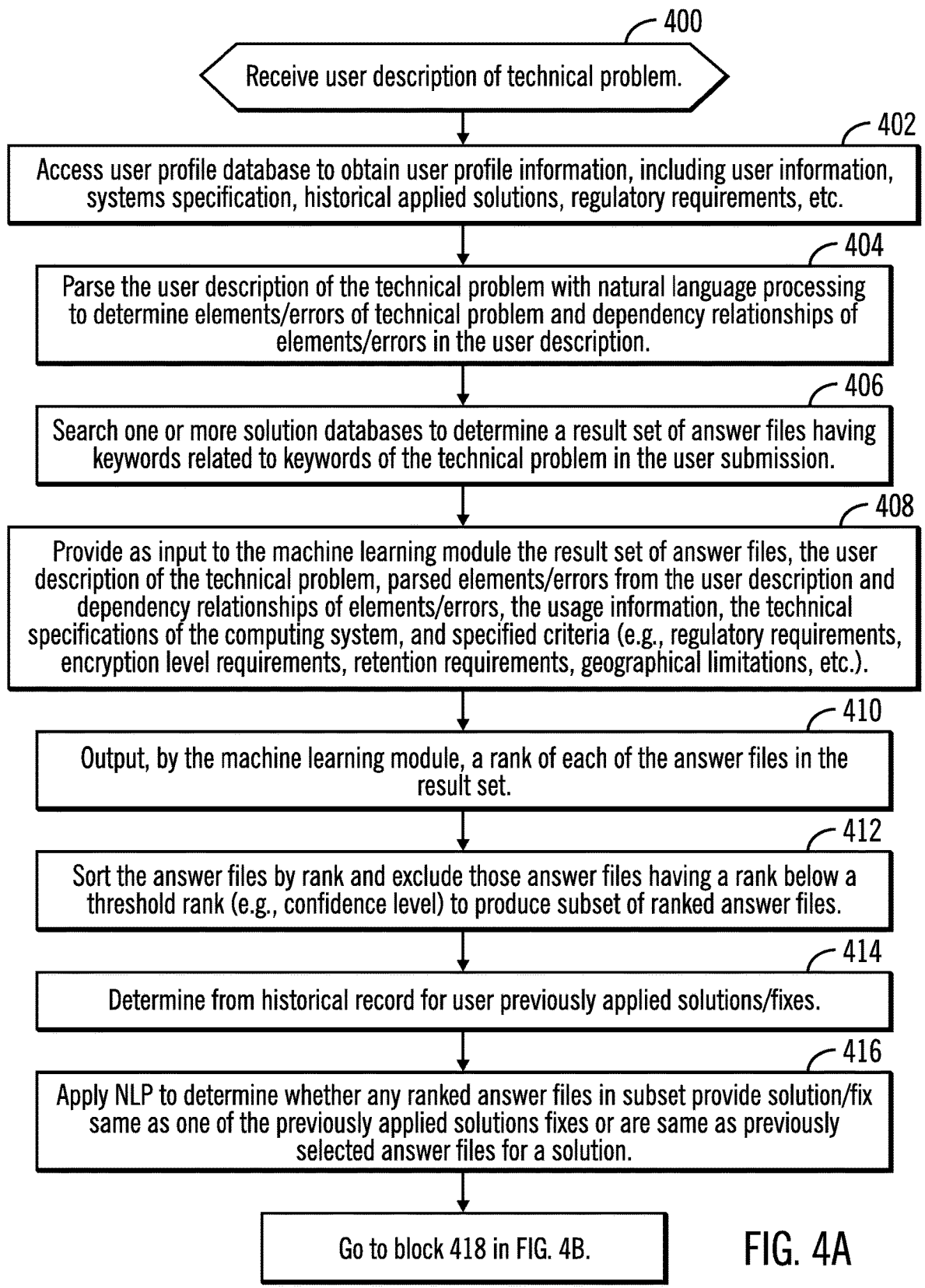
FIGS. 4a and 4b illustrate an embodiment of operations to use a machine learning module to generate a set of answer files having technical solutions and fixes to a user description of a technical problem.
Figure 4B:
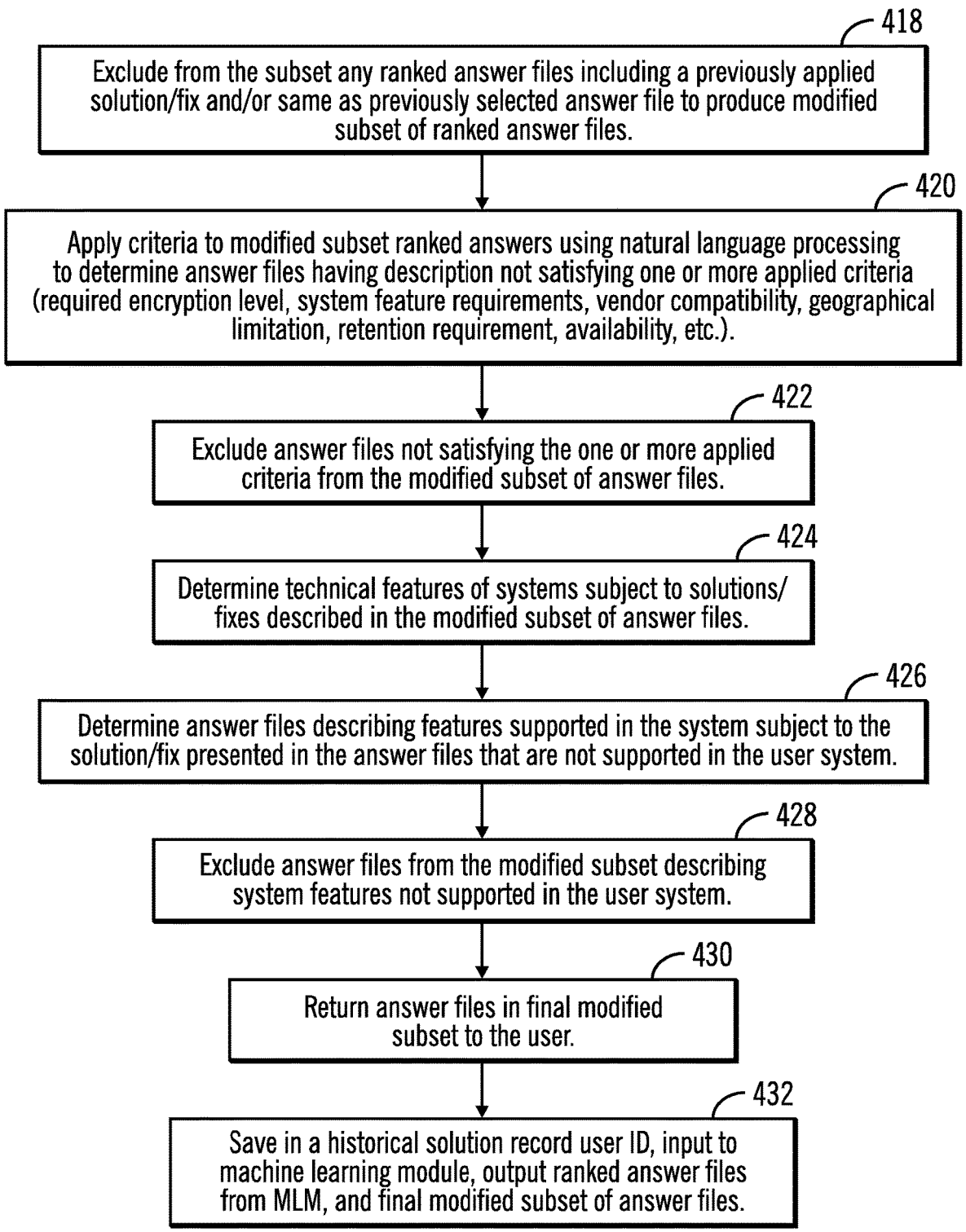

FIGS. 4a and 4b illustrate an embodiment of operations performed by the support manager 109, natural language processor 110, search engine 116, machine learning module 124, filter program 128, and other components to produce an optimal subset of answer files 134 having fixes/solutions to a user description of a technical problem 112. Upon receiving (at block 400) a user description of a technical problem 112 from a user computer (not shown), the support manager 109 accesses (at block 402) the user profile database 200 to obtain user profile information 200, for the user initiating the request, including user information 204, systems specification 206, historical records 208 of previously applied solutions to the user computing system, regulatory requirements 210, etc. The natural language processor 110 parses (at block 404) the user description of the technical problem 112 with natural language processing to determine elements/errors of the described technical problem and dependency relationships of elements/errors in the user description. For instance, if one of the described errors is dependent on other described errors occurring, then that dependency relationship would be determined. The search engine 116 searches (at block 406) one or more solution databases 118, such as knowledge databases, frequently asked questions (FAQ), community bulletin boards, etc., to determine a result set of answer files 122 having keywords related to keywords of the technical problem in the user submission 112. The search may look for matching keywords in the answer files 120 as well as words semantically related or having similar meaning.

The support manager 109 may then provide (at block 408), as input to the machine learning module 124, the result set of answer files 122, the user description of the technical problem 112, parsed elements/errors 114 from the user description and relationship of elements/errors, usage information 204, the technical specifications of the computing system 206, and specified criteria (e.g., regulatory requirements 210, encryption level requirements, retention requirements, geographical limitations, etc.). The machine learning module 124 outputs (at block 410), based on the inputs, ranks of the answer files 126 in the result set 122.

The filter program 128 may then perform various operations on the result set of answer files 122 and ranks 126 to produce a more optimal subset of answer files 134 to the user optimized to be relevant to the described user technical problem 112. The filter program 128 may sort (at block 412) the answer files 122 by rank and those answer files having a rank below a threshold rank, e.g., confidence level, are excluded from the result set 122 to produce a subset of ranked answer files. The filter program 128 may then determine (at block 414) from the historical record 208 for the user previously applied solutions and fixes and the answer files 120 describing the previously applied solutions. The filter program 128 may then apply (at block 416) natural language processing to determine whether any ranked answer files 122 in the subset 134 provide solutions/fixes that are the same as one of the previously applied solutions fixes or are same files previously selected answer files for a solution. The filter program 128 excludes (at block 418 in FIG. 4b) from the subset 134 any ranked answer files including a previously applied solution/fix and/or same as previously selected answer file to produce modified subset 134 of ranked answer files.

The filter program 128 may then apply (at block 420) one or more criteria to a modified subset of ranked answer files 134 using natural language processing to determine answer files having a description not satisfying one or more applied criteria, such as a required encryption level, system feature requirements, vendor compatibility, geographical limitation, retention requirement, availability, etc. which may be indicated in the regulatory requirements 210 or other information. The filter program 128 excludes (at block 422) answer files in the modified subset 134 not satisfying the one or more applied criteria.

The filter program 128 may further determine (at block 424), such as by using natural language processing, technical features, e.g., software and hardware of systems subject to solutions/fixes described in the modified subset of answer files 134. The filter program 128 determines (at block 426) answer files 134 describing features supported in the system subject to the solution/fix presented in the answer files 134 that are not supported in the user system. The filter program 128 excludes (at block 428) answer files from the modified subset 134 describing system features not supported in the user system 206. The resulting modified subset of answer files 134 narrowed by the filter program 128 may then be returned (at block 430) to the user to consider. The support manager 109 may save (at block 432) in a historical solution record $300_i$ the user ID 302, input to machine learning module 304, output ranked answer files 126 from machine learning module 124 in field 306, and final modified subset of answer files 134 delivered to the user in field 308.

With the embodiment of FIGS. 4a and 4b, the machine learning module 124 may be used to generate the ranks of answer files 126 and then the filter program 128 may exclude answer files from the result set 122 that do not satisfy specific requirements or criteria or that provided previously applied solutions and fixes. In this way, the final set of answer files 134 provided to the user was determined from rankings supplied by the machine learning module 124 and then further narrowed to provide the most relevant and likely useful set of answer files for the user to consider, and excludes those answer files 122 that would not be relevant to the specific configuration and requirements of the user system for which the fix is being determined. Further, in certain embodiments, the criteria applied by the filter program 128 may also be used as input to the machine learning module 124 to generate the ranks 126 to conform to the criteria 130 to further improve the relevance of the ranks 126.

Figure 5:
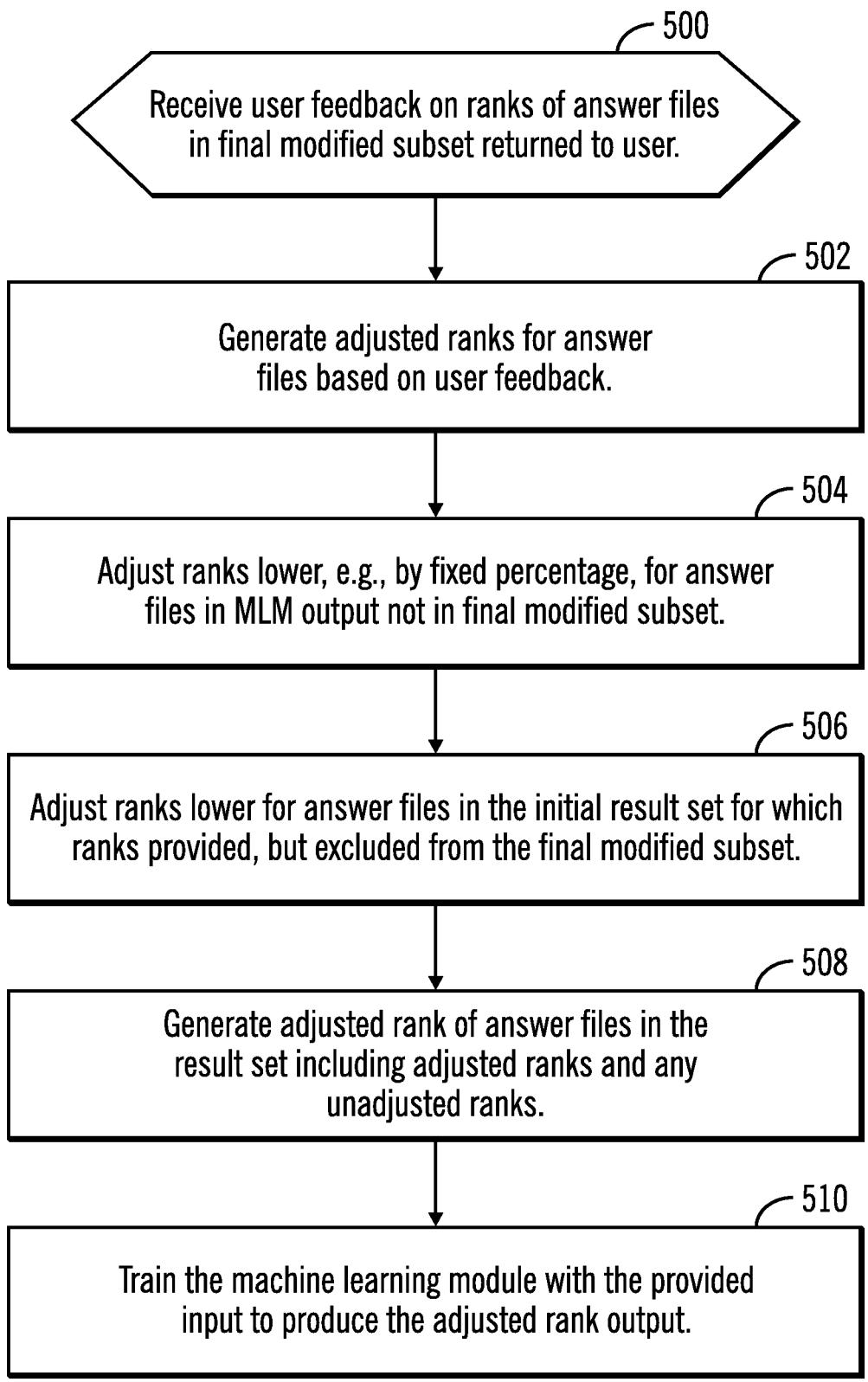
FIG. 5 illustrates an embodiment of operations to train the machine learning module to generate adjusted ranks of answer files having solutions and fixes for a user description of a technical problem based on user feedback on the ranks outputted by the machine learning module.

FIG. 5 illustrates an embodiment of operations performed by the machine learning module (MLM) trainer 136 and the machine learning module 124 to retrain the machine learning module 124 to produce output comprising user adjusted ranks of answer files 138 based user feedback 140. Upon receiving (at block 500) user feedback 140 on ranks in a modified subset 134 returned to the user, the MLM trainer 136 generates (at block 502) adjusted ranks for answer files 138 based on the user feedback 140. For instance, the user feedback 140 may provide specific rank values or may provide indication of accept or reject the output ranks 126. The MLM trainer 136 may adjust the rank by a predetermined amount up or down based on whether the user accepted or rejected, respectively, the ranks 126. The MLM trainer 136 may adjust (at block 504) ranks lower, e.g., by fixed percentage, for answer files 126 in MLM output not in the final modified subset 134.

The MLM trainer 136 further adjusts (at block 506) ranks lower for answer files in the initial result set 122 for which ranks 126 were provided, but were excluded from the final modified subset 134. The MLM trainer 136 generates (at block 508) adjusted ranks of answer files 138 in the result set 122 including ranks adjusted at blocks 504 and 506 and any unadjusted ranks. The machine learning module 124 is trained (at block 510) with the provided input 304 to produce the adjusted rank output 138, such as by using backward propagation to adjust weights and biases at nodes in a hidden layer to produce the adjusted rank output 138.

With the embodiment of FIG. 5, the MLM trainer 136 may generate adjusted ranks 138 for the answer files from the machine learning module 124 ranks 126 based on user feedback 140 and then retrain the machine learning module 124 to produce the adjusted ranks 126. In this way, user feedback is used to improve the ranking the machine learning module 124 will output for answer files based on input specific to the user profile and criteria. This training further optimizes the final output subset of answer files 134 by improving the accuracy of the rankings to predict relevancy of solutions/fixes in answer files presented to the user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
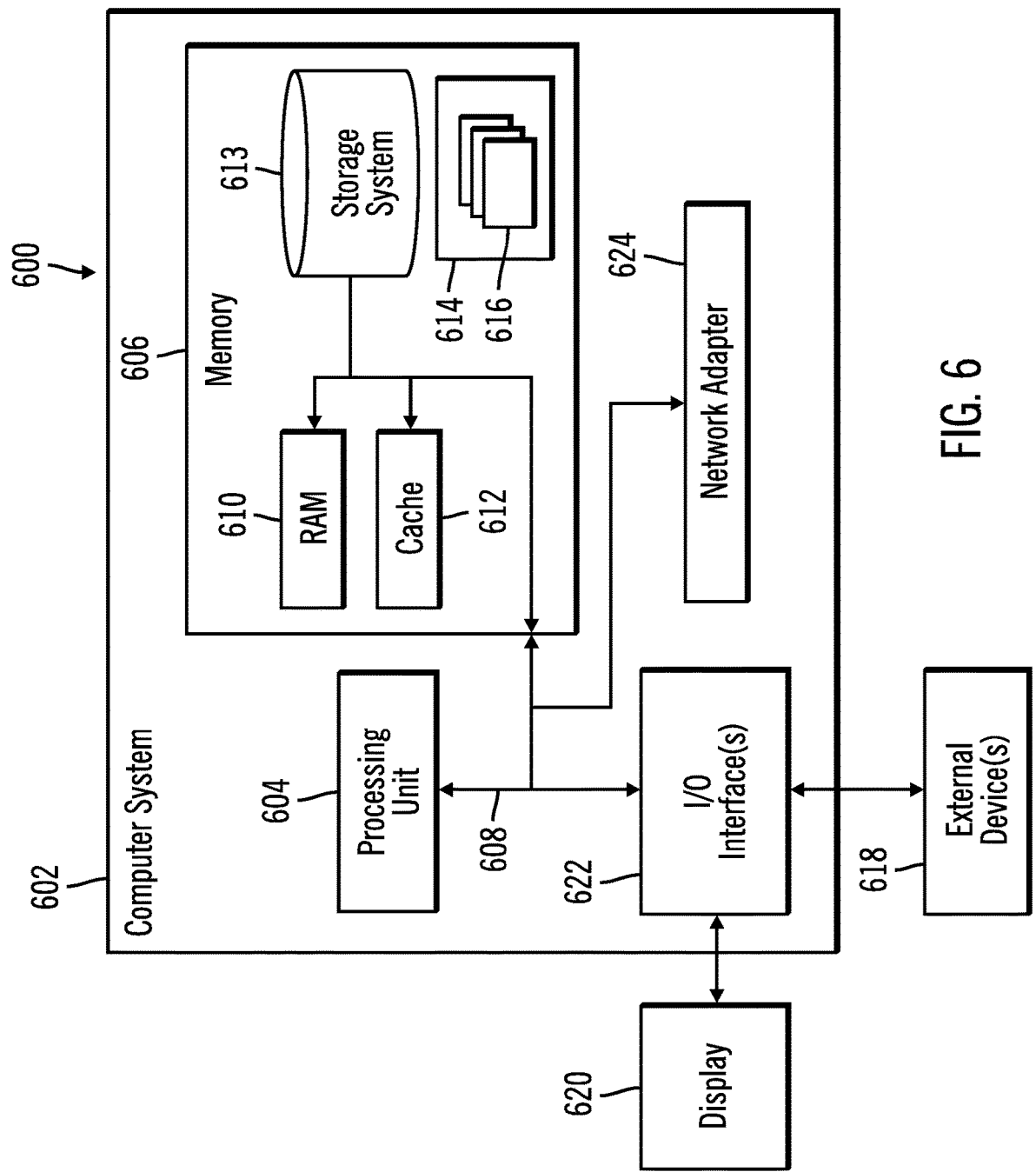
FIG. 6 illustrates a computing environment in which the components of FIG. 1 may be implemented.

The computational components of FIG. 1 of the technical support system 100 may be implemented in one or more computer systems, such as the computer system 602 shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The letter designators, such as i are used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining a solution for a technical support problem for a user of a computing system, wherein the computer program product comprises a computer readable storage medium having program instructions embodied therewith that when executed cause operations, the operations comprising:

receiving a user description of a technical problem with respect to the computing system of the user;

accessing a user database to obtain user profile information and technical specifications of the computing system;

searching a solutions database to determine a result set of answer files having keywords related to keywords of the technical problem in the user description;

providing, as input to a machine learning module, the result set of answer files, the user description of the technical problem, the user profile information, and the technical specifications of the computing system;

outputting, by the machine learning module, ranks of the answer files in the result set;

selecting a subset of answer files in the result set based on the ranks of the answer files in the result set; and returning to the user the subset of answer files.

2. The computer program product of claim 1, wherein the operations further comprise:

applying a criteria to the answer files to determine answer files satisfying the criteria; and excluding from the subset of answer files any answer files not satisfying the criteria.

3. The computer program product of claim 2, wherein the criteria comprises at least one of:

an encryption level, wherein answer files satisfy the criteria that indicate solutions having the encryption level;

user system configuration, wherein answer files satisfy the criteria that indicate solutions compatible with the user system configuration of the computing system;

vendor compatibility, wherein answer files satisfy the criteria that indicate solutions for a vendor compatible with the vendor for the computing system;

geographical limitation, wherein answer files satisfy the criteria that propose solutions satisfying the geographical limitation;

retention requirement, wherein answer files satisfy the criteria that propose solutions satisfying the retention requirement; and system redundancy requirement, wherein answer files satisfy the criteria that propose solutions satisfying the system redundancy requirement.

4. The computer program product of claim 2, wherein the criteria is included as input to the machine learning module to output the ranks of the answer files.

5. The computer program product of claim 1, wherein the operations further comprise:

determining, from a historical record for the user, previously applied solutions from previously applied answer files;

determining answer files in the result set that comprise the previously applied solutions; and excluding from the subset of answer files any answer files that indicate any one of the previously applied solutions.

6. The computer program product of claim 1, wherein the operations further comprise:

determining technical features mentioned in systems subject to solutions described in modified subset of answer files;

determining answer files describing technical features in systems subject to the solutions described in the answer files that are not supported in the computing system; and excluding, from the subset of answer files, answer files describing technical features not supported in the computing system.

7. The computer program product of claim 1, wherein the operations further comprise:

parsing the user description of the technical problem, with natural language processing, to determine a dependency relationship of errors in the user description that result in the technical problem, wherein the input provided to the machine learning module includes the dependency relationship of errors in the user description.

8. The computer program product of claim 1, wherein the operations further comprise:

receiving user feedback on the ranks of the answer files in the subset outputted by the machine learning module;

determining adjusted ranks for the answer files in the subset based on the user feedback; and training the machine learning module with the input that resulted in the outputting of the ranks to produce the adjusted ranks for the answer files.

9. The computer program product of claim 8, wherein the operations further comprise:

adjusting downward ranks for the answer files in the result set that were not included in the subset of answer files to the user, wherein the machine learning module is trained with the input to produce the adjusted ranks for the answer files not in the subset of answer files to the user.

10. A system for determining a solution for a technical support problem for a user of a computing system, comprising:

a processor; and a computer readable storage medium having program instructions that when executed by the processor cause operations, the operations comprising:

receiving a user description of a technical problem with respect to the computing system of the user;

accessing a user database to obtain user profile information and technical specifications of the computing system;

searching a solutions database to determine a result set of answer files having keywords related to keywords of the technical problem in the user description;

providing, as input to a machine learning module, the result set of answer files, the user description of the technical problem, the user profile information, and the technical specifications of the computing system;

outputting, by the machine learning module, ranks of the answer files in the result set;

selecting a subset of answer files in the result set based on the ranks of the answer files in the result set; and returning to the user the subset of answer files.

11. The system of claim 10, wherein the operations further comprise:

applying a criteria to the answer files to determine answer files satisfying the criteria; and excluding from the subset of answer files any answer files not satisfying the criteria.

12. The system of claim 10, wherein the operations further comprise:

determining, from a historical record for the user, previously applied solutions from previously applied answer files;

determining answer files in the result set that comprise the previously applied solutions; and excluding from the subset of answer files any answer files that indicate any one of the previously applied solutions.

13. The system of claim 10, wherein the operations further comprise:
parsing the user description of the technical problem, with natural language processing, to determine a dependency relationship of errors in the user description that result in the technical problem, wherein the input provided to the machine learning module includes the dependency relationship of errors in the user description.

14. The system of claim 10, wherein the operations further comprise:
receiving user feedback on the ranks of the answer files in the subset outputted by the machine learning module;
determining adjusted ranks for the answer files in the subset based on the user feedback; and
training the machine learning module with the input that resulted in the outputting of the ranks to produce the adjusted ranks for the answer files.

15. The system of claim 14, wherein the operations further comprise:
adjusting downward ranks for the answer files in the result set that were not included in the subset of answer files to the user, wherein the machine learning module is trained with the input to produce the adjusted ranks for the answer files not in the subset of answer files to the user.

16. A method for determining a solution for a technical support problem for a user of a computing system, comprising:
receiving a user description of a technical problem with respect to the computing system of the user;
accessing a user database to obtain user profile information and technical specifications of the computing system;
searching a solutions database to determine a result set of answer files having keywords related to keywords of the technical problem in the user description;
providing, as input to a machine learning module, the result set of answer files, the user description of the technical problem, the user profile information, and the technical specifications of the computing system;
outputting, by the machine learning module, ranks of the answer files in the result set;
selecting a subset of answer files in the result set based on the ranks of the answer files in the result set; and
returning to the user the subset of answer files.

17. The method of claim 16, further comprising:
applying a criteria to the answer files to determine answer files satisfying the criteria; and
excluding from the subset of answer files any answer files not satisfying the criteria.

18. The method of claim 16, further comprising:
determining, from a historical record for the user, previously applied solutions from previously applied answer files;
determining answer files in the result set that comprise the previously applied solutions; and
excluding from the subset of answer files any answer files that indicate any one of the previously applied solutions.

19. The method of claim 16, further comprising:
parsing the user description of the technical problem, with natural language processing, to determine a dependency relationship of errors in the user description that result in the technical problem, wherein the input provided to the machine learning module includes the dependency relationship of errors in the user description.

20. The method of claim 16, further comprising:
receiving user feedback on the ranks of the answer files in the subset outputted by the machine learning module;
determining adjusted ranks for the answer files in the subset based on the user feedback; and
training the machine learning module with the input that resulted in the outputting of the ranks to produce the adjusted ranks for the answer files.

\* \* \* \* \*